(No Model.)

H. PATTEN.
TABLE LEVELING DEVICE.

No. 587,489. Patented Aug. 3, 1897.

Witnesses
Andrew Ferguson
C. E. Buckland

Inventor
Hartwell Patten
By W. E. Simonds
Attorney

UNITED STATES PATENT OFFICE.

HARTWELL PATTEN, OF HARTFORD, CONNECTICUT.

TABLE-LEVELING DEVICE.

SPECIFICATION forming part of Letters Patent No. 587,489, dated August 3, 1897.

Application filed December 10, 1896. Serial No. 615,183. (No model.)

*To all whom it may concern:*

Be it known that I, HARTWELL PATTEN, a citizen of the United States of America, residing at Hartford, in the county of Hartford and State of Connecticut, have invented a certain new and useful Improvement in Table-Leveling Devices, of which the following is a description, reference being had to the accompanying drawings, wherein—

Figure 1:
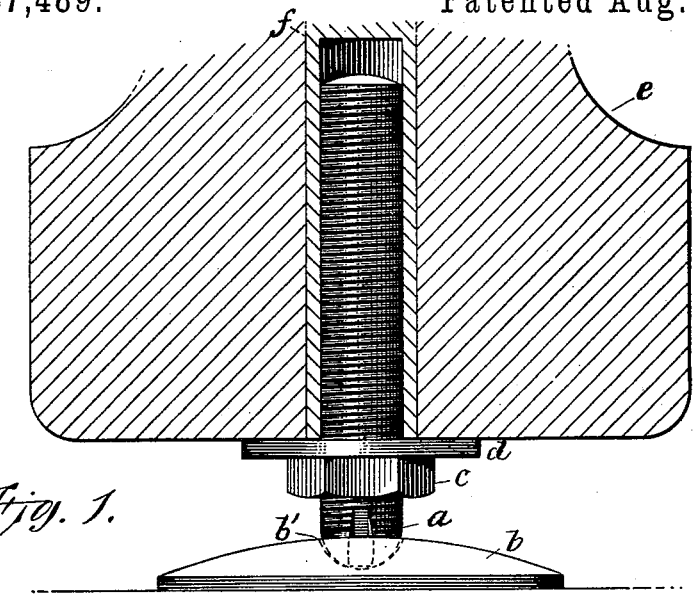
Figure 2:
Figure 3:
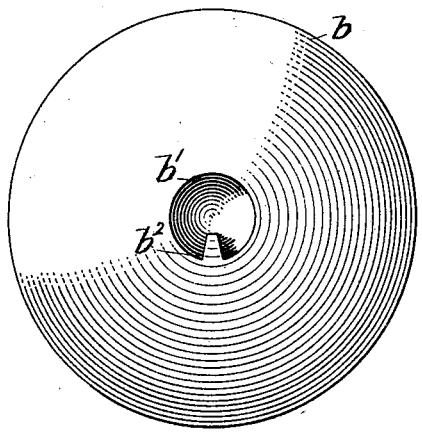

Figure 1 is a view in elevation of the leveling device, with a view in central vertical section of a billiard-table leg. Fig. 2 is an end view of the lower end of the leveling-screw. Fig. 3 is a top or plan view of the floor-plate.

The object of the improvement is to provide a device designed as an appurtenance for the legs of billiard-tables and the like for the purpose of readily adjusting the heights of the respective legs from the floor in order to keep the table level.

In the accompanying drawings, the letter $a$ denotes an exteriorly-threaded screw, the lower end of which is rounded and rests in a corresponding rounded socket $b'$ in the floor-plate $b$. This socket carries a wing $b^2$, fitting a corresponding mortise $a'$ in the lower end of the screw $a$, and these two parts by their coöperation prevent the screw from turning rotarily.

The letter $c$ denotes a nut carried on the screw $a$. The letter $d$ denotes a washer borne by said nut. The letter $e$ denotes a billiard-table leg resting on said washer, and by preference the billiard-table leg carries a sheath $f$, inclosing the screw.

It will be readily understood that by rotating the nut $c$ the billiard-table leg and corresponding part of the billiard-table may be raised or lowered accordingly.

I claim as my improvement—

The screw $a$ provided with rounded lower end and mortise $a'$ in combination with the nut $c$ and with the floor-plate $b$ provided with rounded socket $b'$, and wing $b^2$, all substantially as described and for the purposes set forth.

HARTWELL PATTEN.

Witnesses:
ANDREW FERGUSON,
C. E. BUCKLAND.